Jan. 26, 1960     E. F. MACKS     2,922,491
LUBRICATION BY MOVING GAS-SUSPENDED PARTICLES
Filed Aug. 7, 1953
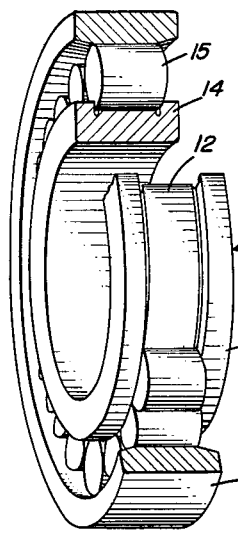
FIG. 2
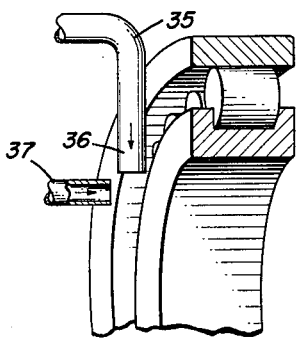
FIG. 3
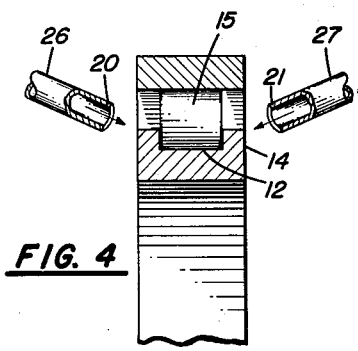
FIG. 4
FIG. 1
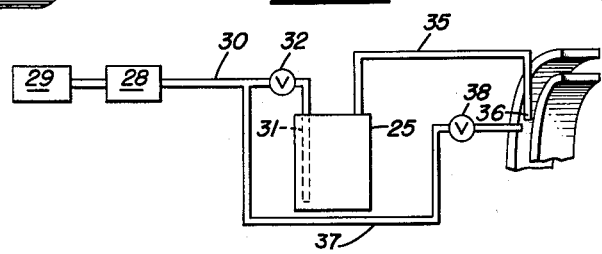
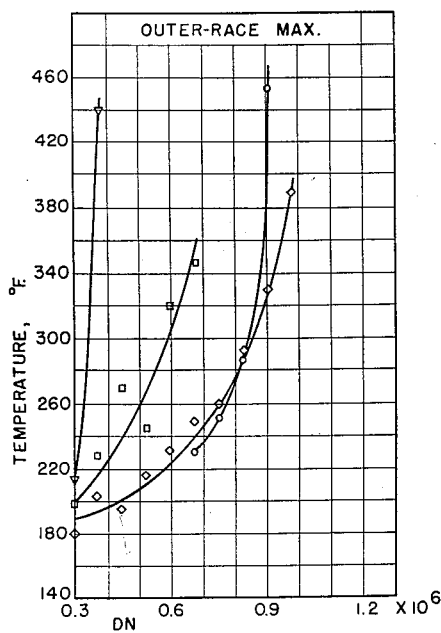
FIG. 5
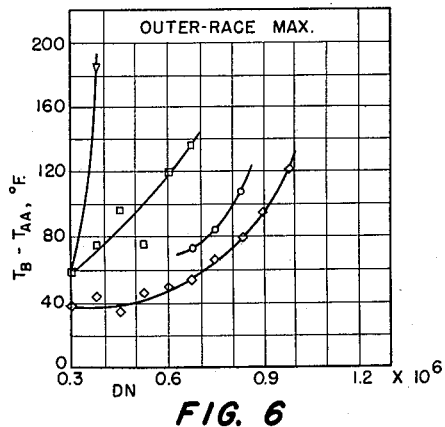
FIG. 6
INVENTOR
ELMER FRED MACKS
BY
ATTORNEYS

United States Patent Office 2,922,491
Patented Jan. 26, 1960

2,922,491

LUBRICATION BY MOVING GAS-SUSPENDED PARTICLES

Elmer Fred Macks, Cleveland, Ohio

Application August 7, 1953, Serial No. 373,077

1 Claim. (Cl. 184—1)

(Granted under Title 35, U.S. Code (1952), sec. 266)

The invention described herein may be manufactured and used by or for the Government of the United States of America for governmental purposes without the payment of any royalties thereon or therefor.

This invention relates to machine parts lubrication.

Heretofore, the use of lubricants in liquid form, such as oil, has long been common practice in machine parts within the temperature ranges of −20° F. to 300° F. Where high temperatures or high speeds, however, are involved, the heat volatilizes the oils resulting in rapid deterioration of the coacting parts. Solid lubricants such as flaked graphite have been used in a constant channeled flow to friction elements under air or steam pressures, but such uses involve difficulties in structural arrangements and feed and are found inadequate at high speeds over 3,000 revolutions per minute (r.p.m.) and temperatures over 300° F.

Briefly stated, the hereindescribed invention involves application to a bearing of lubricating solid particles gas-suspended as a mist with the bearing optionally coated with a bonded lubricant which preferably is molybdenum disulfide.

An important object of this invention is to supply a bearing lubricant resistant to deterioration or elimination at high temperatures. A related object is to provide a bearing lubricant which is adequate at high speeds of rotation. Still another object is to provide means effective for utilization of solid lubricants in particle form for lubrication purposes. An object, also, is to provide means for controlling the size of lubricating particles projected onto the friction surfaces.

Other objects and many of the attendant advantages of this invention will be readily appreciated as the same becomes better understood by reference to the following detailed description when considered in connection with the accompany drawings in which:

Fig. 1 is a diagramatic view of the lubricating apparatus;

Fig. 2 is a view, partly in section, of a cageless roller bearing;

Fig. 3 is a fragmentary view of a cageless roller bearing showing a controlled single lubricant jet;

Fig. 4 is a fragmentary view showing application of two opposed lubricating jets to a cageless roller bearing;

Fig. 5 is a set of graphs contrasting the temperature variation of bearings with speed while lubricated by different methods of the invention; and Fig. 6 is a set of graphs illustrating the effect of speed variation on the difference between bearing and ambient temperatures for modified methods of lubrication.

While other types of bearings are usable including ball bearings with or without cages, a cageless roller bearing 10 is shown in Fig. 2 including the inner ring 11 provided with a peripheral race way 12 on its outer periphery, and the outer ring 13 concentric with inner ring 11. The race way flanges 14 normally retain in position in the runway 12, the rollers 15.

The solid lubricant used is molybdenum disulphide ($MoS_2$) which has been shown to have high load-carrying capacity at high pressures, to maintain low coefficients of friction over a wide range of sliding velocities, and to maintain a low friction coefficient during its oxidation as long as an effective film of the disulfide remains. Since oxidation of molybdenum disulfide begins at a very low rate at about 750° F., it can be seen that for high temperature uses, due to heated ambient atmospheres or high speeds, this method is desirable.

The life of lubrication and effectiveness of the disulfide is dependent on the maintenance of a bearing film between the rubbing surface, and it is important that the material be in a form for developing strong adherence to the rubbing surfaces and also, that the material fill all the valleys and other surface irregularities in the friction elements. This is best accomplished by grinding the disulfide to a fine powder and applying the same to the rubbing surface, either by means of a liquid bond, such as corn syrup, or by continuous application of an air-mist including the particles colloidally suspended therein, or by using both of these methods.

In the film bonding method, the molybdenum disulfide is ground to size in which preferably eighty-nine percent of the particles are under 400 mesh, fifty-nine percent are under twenty-two microns and not over one percent are over 200 mesh. A powder is thus prepared which may readily be air-floated, in some cases a practically permanent air suspension being secured. This powder is thoroughly mixed with a commercial brown corn syrup, applied to the pre-cleaned metal, friction surface baked until dry or air dried and the external surface removed to leave a tenacious underlying film. Experiment has indicated that the syrup supporting vehicle on a steel base becomes resinous in form and reduces the $Fe_2O_3$ film to $Fe_3O_4$ with a lower coefficient of friction.

In the gas or air-mist method, the powdered disulfide is placed in a container 25 with which junction to the nozzle pipe lines is made and relatively low air pressure from pump 28, driven by motor 29 is applied to the container to agitate the contents and produce the laden nozzle air streams.

The conduit 30 from the pump is connected to a depending tube 31 inside container 25, the tube end being open and adjacent but spaced from the bottom of the container so that the incoming air or other gas produces an active diffusion of the minute particles resulting in approximately permanent suspension thereof in the gas current. The powder, impacting on the roller and runway surfaces of bearing 10, is continuously trapped thereby, and thus supplies fresh solid lubricant as long as the container pressure is maintained. Preferably the powder should be applied continuously but favorable results with intermittent application have been secured. Valve 32 may be used to control the flow rate.

As shown in Figs. 1 and 3, a single container supply pipe 35, terminates in a nozzle 36 directed toward one side of the bearing 10. A second air pipe 37, extending at right angles to supply nozzle 36, is provided with control valve 38, and has its nozzle tip terminating approximately in line with the axis of nozzle 36. In operation, air pressure is applied to tube 37 with such force that only the lighter or smaller particles discharged from nozzle 31 are deflected to the bearing, the heavier or larger particles being carried beyond the friction surfaces. The advantage of this nozzle arrangement is due to its greater uniformity of deposition, since, with direct flow to the bearing, the masses of solid lubricant which form at the nozzle tip break away at intervals producing non-uniform amounts of lubricant on the friction surfaces. In the arrangement of Fig. 1, however, which is usually preferred, the larger particle masses are diverted from the bearing permitting a uniform supply of fine powdered lubricant to be supplied to the bearing surfaces, resulting in lower bearing operating temperatures.

Fig. 4 illustrates a modified nozzle set-up desirable in some installations, wherein the nozzle conduit 35 divides in branch lines 26 and 27, terminating respectively in nozzles 20 and 21, positioned on opposite sides of the bearing. As shown, these nozzles are inclined symmetrically toward the runway 12 so as to direct lubricant toward the exposed ends of the rollers.

The improvement in lubrication at high temperatures over oil is notable, the application of $MoS_2$—air mist lubricant to a ball bearing permitting operation at 1000° F. for as long as eight hours without failure. In a typical test, with temperatures up to 1000° F., a bearing of one inch bore and ten balls were used, each ball of 0.250 inch diameter. A flow rate of molybdenum disulfide was maintained at 0.35 to 0.7 ounce per hour and at an air pressure of 0.3–0.8 inch mercury. A thrust load of 20 pounds and speed of about 1725 revolutions per minute (DN values between $0.03 \times 10^6$ and $0.09 \times 10^6$ being used, DN being the product of the bearing bore in millimeters times shaft speed in revolutions per minute). This compares with a limiting range of about 300° F. for oil and about 400° F. for synthetic lubricants.

In the case of speed, cageless roller type bearings were used in comparative tests, one with a syrup bonded coating only and the other with combined syrup bonded coating and $MoS_2$—Air Mist lubrication. Twenty-one cylindrical rollers were employed each of 0.5635 inch diameter and 0.5625 inch length. A radial load of 368 pounds was applied and DN values between $0.3 \times 10^6$ and $0.975 \times 10^6$ (13000 r.p.m.). The results, with a maximum temperature around 400° F., indicated adequate lubrication within the stated speed ranges comparable to oil lubrication. After a 11.8 hour test run, no measurable wear could be detected on any bearing surface.

Comparative speed temperature graphs as between the syrup bonded coating and the combined coating-air mist lubrication are indicated in Fig. 5 respectively, by graphs carrying indicia $\Delta$ and $\diamond$, the latter showing marked superiority in lower temperature operation at varying speeds. Tests were also made to show temperature-speed variations with jets of the opposed nozzle type as compared to the controlled single nozzle type, and results are indicated in Fig. 5 by graphs carrying indicia □ and O respectively, using cage type bearings. The lower temperature operation of the controlled single nozzle is apparent from these graphs. The controlled single nozzle shows a maximum successful DN value of $0.90 \times 10^6$ as compared to the opposed nozzle DN value of $0.675 \times 10^6$. The lower temperature of operation in the single nozzle form is not due to the cooling effect of the air jet since there is no rise in temperature when this jet is closed in trial intervals. There is no evidence of wear on the steel surfaces.

In Fig. 6, comparisons are made between graphs showing the variation of the difference between temperature and ambient temperatures with DN values. In general, these Fig. 6 curves are comparable in temperature relationship to the curves of Fig. 5, the indicia therein referring to the same type of curve as in Fig. 5. The Fig. 6 curves, therefore, confirm the showing of those of Fig. 5, cage type bearing being used.

Mention has been made of corn syrup as a suitable bond, but it has been determined that other liquid vehicles, which are resin forming when heated or dried as a coating on steel, might be used, such as glycerine, ethylene glycol, polyglycol ether, asphalt-base varnish, silicone-base varnish and dextrose. Also, reference has been made, by way of example, to ball bearings and cageless roller bearing, but the lubrication as described has been successfully applied to various types of caged bearings as well. Molybdenum disulfide was selected for test use as the solid lubricant, but investigation has revealed that the laminated structure which characterizes this substance is found also in cadmium iodide ($CdI_2$), boron nitride (BN) and other substances; and hence, molybdenum disulfide may be considered merely as representative of this group, other substances being usable.

Other modifications are possible in the light of the above teachings and it should be understood, therefore, that within the scope of the appended claims the invention may be practiced otherwise than as specifically described.

What is claimed is:

A method of lubricating the relatively moving surfaces of a bearing with minute particles of a solid lubricant which comprises gas-floating various size particles of said lubricant to form a mist, directing said mist in a stream along and adjacent one side of the bearing, and intersecting said mist stream with a stream of air only directed toward said bearing side to divert and impact the minute particles only of said mist directly against said bearing surfaces.

References Cited in the file of this patent

UNITED STATES PATENTS

| | | |
|---|---|---|
| 744,101 | Pielicke | Nov. 17, 1903 |
| 1,128,059 | Schoop | Feb. 9, 1915 |
| 1,654,509 | Claus | Dec. 27, 1927 |
| 2,367,946 | Kaercher | Jan. 23, 1945 |
| 2,470,136 | Bramberry | May 17, 1949 |
| 2,622,993 | McCullough et al. | Dec. 23, 1952 |